Patented Nov. 2, 1943

2,333,197

UNITED STATES PATENT OFFICE 2,333,197

DISPERSION OF HYDROPHILIC PIGMENTS

William B. Reynolds, Elmhurst, N. Y., assignor to Interchemical Corporation, New York, N. Y., a corporation of Ohio No Drawing. Application January 27, 1940, Serial No. 315,946

8 Claims. (Cl. 106—262)

This invention relates to the dispersion of certain disazo pigment dyestuffs in water immiscible organic film forming vehicles, and is particularly directed to a method of obtaining a satisfactory dispersion of such pigments by removal of water from a pigment pulp, followed by dispersion in the presence of water.

The use of water insoluble azo dyestuffs in pigment form is limited by the fact that many azo dyestuffs do not produce satisfactory colors when precipitated and dried in the ordinary way, as pigments. Furthermore, many azo dyestuffs, which can be satisfactorily precipitated as pigments, gives colors which are considerably poorer in tinctorial value when dried than when in pulp form. These phenomena are particularly noticeable in the group of dyestuffs of the type—

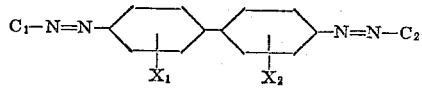

where $X_1$ and $X_2$ are members of the class consisting of hydrogen, halogen, alkyl, and alkoxy, and $C_1$ and $C_2$ are residues of coupling components selected from the class consisting of naphthol-mono-sulfonic acids and naphthol disulfonic acids, the dyestuffs being in the form of metallic salts.

When dyestuffs of this class are precipitated, and the precipitates formed are filtered, washed and dried in conventional fashion, the resultant dried lumps are often difficult to powder. When no difficulty of this sort is encountered, the powders produced are either lacking in substantial pigment properties, or are much weaker in color strength than the dyestuff, regardless of the method of dispersion in the vehicle. The drying appears to have a definitely harmful effect on the pigment properties.

Attempts have been made to utilize these pigment dyestuffs without drying them, by flushing the pigment from the water to an organic medium. However, this class of pigment dyestuffs is so hydrophilic that the organic medium will not replace the water on the dyestuff, even in the presence of surface active agents designed to facilitate this transfer. Flushing thus produces mixtures of aqueous pigment dyestuff pulp and unpigmented organic medium.

It has been proposed to overcome this difficulty by malaxating the pigment pulp on an open malaxating mill, such as a two-roll rubber compounding mill, with an organic plastic, evaporating the water while malaxation proceeds. This process, while successful, requires the use of the expensive dispersion operation of malaxation over an extended period of time, due to the necessity for evaporating large quantities of water—from four to over ten times the weight of the pigment, since filter press cakes of these pigments vary in pigment content from about 6 to 20%, depending on the pigment.

I have discovered that the impairment of the pigment properties occasioned in this class of dyestuff in the ordinary drying operation is completely reversible, and that the dried pigment may be dispersed with any water immiscible organic film forming vehicle, by conducting the dispersion in the presence of limited quantities of water, which can be absorbed by the vehicle, and can be dissipated as vapor by the normal heating of conventional dispersion mills.

In order to get uniform wetting of the pigment, I find that there should be at least one part of water present for each part of pigment; with lower amounts of water, part of the pigment remains dry, and strength is lost. When amounts of water in excess of two parts for each part of pigment are used, I find it extremely difficult to absorb and/or evaporate the water in ordinary dispersion practice, so that I prefer to maintain my water content below this level.

The desired water content may be attained by partially drying a press cake, and then remixing the pigment so that the relatively wet pigment in the interior of the cake is thoroughly mixed with the bone dry pigment on the outside of the cake. Control of water content is more accurately insured, however, by completely drying the cake, and then adding the desired amount of water. If desired, the unwet pigment may be ground with a vehicle containing water; slightly better results are obtained when the wet pigment is ground in a dry vehicle.

Substantially any form of dispersions apparatus may be used. I have used multiple-roll mills, buhr-stone mills, ball mills, and other common dispersion machines.

Typical examples of my invention are the following:

Example 1

3.66 parts of dianisidine are slurried with 9 parts of 31% hydrochloric acid and 200 parts of water. The slurry is iced to 0–5° C., and tetrazotized by the addition of 2.07 parts of sodium nitrite dissolved in 15 parts of water. The tetrazo thus prepared is run into a coupling solution consisting of 23 parts of a 33% paste of 2-naphthol 6-sulphonic acid (Schaeffer salt), 11 parts of soda ash and 400 parts of water. After the coupling is complete, the dye slurry is heated to 60° C. and into it is slowly run a solution of copper sulfate prepared by dissolving 10 parts of blue vitriol in 200 parts of water. The coppered dyestuff is then heated to 95° C. for ½ hour, filtered and washed salt free. The press cake solids usually run 6–8%.

A portion of the pulp as prepared above is dried in a humidity controlled oven at 70° C. The dried color becomes very hard and bronzy and shows practically no tinctorial strength when milled in oil and bleached with zinc white. A portion of this dry, hard color is mixed in any suitable mixer with an equal weight of water. The bright blue of the color immediately reappears indicating the reversibility of the drying effect. The 50% pulp as prepared above gives, with suitable vehicle, a bright, blue ink of excellent tinting and fastness properties. For example, it may be dispersed in #00 lithographic varnish on a three roll mill.

Example 2

A copper complex of the dyestuff, prepared by coupling tetrazotized dianisidine with 1-naphthol 4-sulfonic acid (Neville and Winther's acid), is prepared exactly as in Example 1. Pulp solids run about 12%. When dried to 50% water content and dispersed as in Example 1, attractive blues are obtained which are redder in shade than the products of Example 1.

Example 3

Same as Example 1, but use the coppered dyestuff prepared by coupling tetrazotized tolidine with Schaeffer salt. Pulp solids run about 12%. When treated as in Example 1, a very clear blue is obtained.

Example 4

Same as Example 1, but use the coppered dyestuff prepared by coupling tetrazotized 3,3-dichlor benzidine with Schaeffer salt. Pulp solids run about 9%. In this case a red violet is obtained.

Example 5

The pulp of Example 1 is reduced to about 50% water content, and 50 parts of pulp are malaxated on a two roll mill with 74 parts of a resin (formed by the interaction of maleic acid and resin, followed by esterification with glycerol) and 1 part of zinc naphthenate. The chip so obtained is formulated into a lacquer having the following break-down composition:

| | Parts |
|---|---|
| Organic solvent soluble urea resin | 15 |
| Oil modified glycerol phthalate resin (50% soya bean oil) | 15 |
| Chip: | |
|     Maleic rosin—glycerol resin | 3 |
|     Dispersed pigment | 1 |
| Mixed solvent | 66 |
| | 100 |

This lacquer is ready for spraying.
The dry lacquer film is a very deep blue black.

Example 6

The dried pulp of Example 5, malaxated in a rosin glycerol ester modified with phenol aldehyde resin to a chip containing—

| | Parts |
|---|---|
| Resin | 59 |
| Zinc naphthenate | 1 |
| Pigment | 40 | may be used to produce a typographic printing ink containing—

| | Parts |
|---|---|
| Above resin | 27.4 |
| Dispersed pigment | 18.2 |
| Aromatic solvent (boiling range 260–290° C.) | 54.4 |

The additional resin needed is dissolved in the solvent. The chip is soaked in the resin solution, after which the mixture is given several passes over the ink mill. The resulting ink prints a very deep blue, bordering on blue black.

Example 7

The pulp of Example 1 may be also dispersed as follows:

Charge the two roll mill with 79 parts of ethyl cellulose (Dow "Ethocel"—"Standard" viscosity and ethoxy content) and 1 part of a wetting agent. Add enough pulp in small batches to give 20 parts of dry pigment, as already described.

The resulting chip has a content of 20% pigment by weight.

The chip obtained is formulated into a lacquer the composition of which is—

| | Parts |
|---|---|
| Ethyl cellulose—standard viscosity | 8 |
| Alkyd resin—drying oil modified | 8 |
| Dibutyl phthalate | 2 |
| Pigment | ½ |
| Mixed solvents | 81½ |

The pigment is used in dispersion form in 2 parts of the total to 8 parts of ethyl cellulose.

This lacquer is thinned to spraying consistency and applied.

It leaves a very deep blue black, of a redder shade than Example 5.

As indicated above, the drying operation is completely reversible, so the pigment may be dried completely to produce a non-pigmentary powder, and rehydrated before dispersion, or it may be dried partially, in which case rehydration of the completely dried out surface portions occurs during dispersion.

Substantially any of the common organic coating compositions may be used to disperse the pigment. I have used raw linseed bodied oils and similar oils, oleoresinous varnishes, cellulose ester and cellulose ether lacquers, and synthetic and natural resin solutions, including practically all of the resins commonly used in the coating industry.

While the pigments described in the examples are typical of my invention, many other combinations are possible, using various tetrazo compounds of the class described above, in combination with the described coupling ingredients. Typical tetrazo compounds may be prepared from benzidine, di chlor benzidine, tolidine and dianisidine. Typical coupling components are F-acid (2-naphthol-7-sulfonic acid), Schaeffer salt (2-naphthol-6-sulfonic acid), L-acid (1-naphthol-5-sulfonic acid), and R-salt (2-naphthol 3-6 disulfonic acid). The metals useful in forming the dyestuff include the alkali metals, the alkaline earths, nickel, cobalt, zinc, copper, iron, manganese, aluminum, and chromium.

Various modifications can of course be made in my invention without departing from its scope, which is defined in the claims.

I claim:

1. The method of dispersing a pigment of the formula:

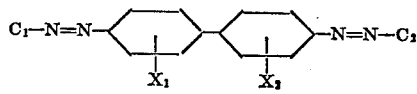

where $X_1$ and $X_2$ are members of the class consisting of hydrogen, halogen, alkyl and alkoxy, and $C_1$ and $C_2$ are residues of coupling components selected from the class consisting of naphthol mono-sulfonic acids and naphthol di-sulfonic acids, in the form of a metallic salt, which pigment is not dispersible in an organic non-aqueous liquid in its dry state to produce a colored composition utilizing a substantial portion of the color strength which the pigment displays in aqueous media, and will not flush from a water pulp to an oily phase because of its extreme hydrophilic character, which comprises removing water from the aqueous filter press cake obtained in the manufacture of the pigment whereby at least a portion of the pigment is dehydrated, and thereafter rehydrating the dehydrated pigment dispersing the pigment in a non-aqueous organic film forming vehicle, in the presence of an amount of water at least equal in weight to the weight of the pigment and not exceeding about twice the weight of pigment.

2. The method of dispersing a pigment of the formula:

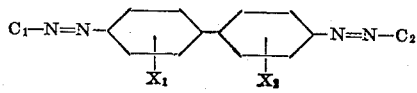

where $X_1$ and $X_2$ are members of the class consisting of hydrogen, halogen, alkyl and alkoxy, and $C_1$ and $C_2$ are residues of coupling components selected from the class consisting of naphthol mono-sulfonic acids and naphthol di-sulfonic acids, in the form of a metallic salt, which pigment is not dispersible in an organic non-aqueous liquid in its dry state to produce a colored composition utilizing a substantial portion of the color strength which the pigment displays in aqueous media, and will not flush from a water pulp to an oily phase because of its extreme hydrophilic character, which comprises drying the pigment and thereafter rehydrating it and dispersing the rehydrated pigment in a non-aqueous organic film forming vehicle.

3. The method of dispersing a pigment of the formula:

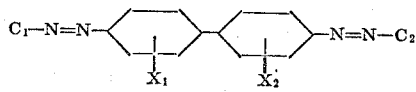

where $X_1$ and $X_2$ are members of the class consisting of hydrogen, halogen, alkyl and alkoxy, and $C_1$ and $C_2$ are residues of coupling components selected from the class consisting of naphthol mono-sulfonic acids and naphthol di-sulfonic acids, in the form of a metallic salt, which pigment is not dispersible in an organic non-aqueous liquid in its dry state to produce a colored composition utilizing a substantial portion of the color strength which the pigment displays in aqueous media, and will not flush from a water pulp to an oily phase because of its extreme hydrophilic character, which comprises drying the pigment, rehydrating it with from 1 to 2 parts by weight of water based on the pigment, and dispersing the rehydrated pigment in a non-aqueous organic film forming vehicle.

4. The method of dispersing a pigment of the formula:

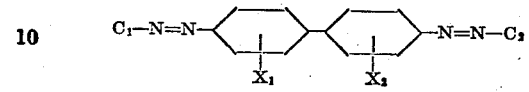

where $X_1$ and $X_2$ are members of the class consisting of hydrogen, halogen, alkyl and alkoxy, and $C_1$ and $C_2$ are residues of coupling components selected from the class consisting of naphthol mono-sulfonic acids and naphthol di-sulfonic acids, in the form of a metallic salt, which pigment is not dispersible in an organic non-aqueous liquid in its dry state to produce a colored composition utilizing a substantial portion of the color strength which the pigment displays in aqueous media, and will not flush from a water pulp to an oily phase because of its extreme hydrophilic character, which comprises drying the pigment, rehydrating it with from 1 to 2 parts by weight of water based on the pigment, and dispersing the rehydrated pigment in a non-aqueous organic film forming vehicle under such conditions that the water is substantially evaporated.

5. The method of dispersing a pigment of the formula:

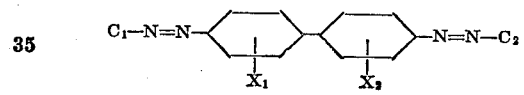

where $X_1$ and $X_2$ are members of the class consisting of hydrogen, halogen, alkyl and alkoxy, and $C_1$ and $C_2$ are residues of coupling components selected from the class consisting of naphthol mono-sulfonic acids and naphthol di-sulfonic acids, in the form of a metallic salt, which pigment is not dispersible in an organic non-aqueous liquid in its dry state to produce a colored composition utilizing a substantial portion of the color strength which the pigment displays in aqueous media, and will not flush from a water pulp to an oily phase because of its extreme hydrophilic character, which comprises removing the water from a mixture of pigment and water obtained in the manufacture of the pigment until the water content is between 50 and 66⅔%, and thereafter dispersing the pigment in a non-aqueous organic film forming vehicle.

6. The method of claim 1, in which the pigment is a metallized disazo pigment prepared from tetrazotized dianisidine and a coupling component of the class consisting of naphthol mono-sulfonic acids and naphthol di-sulfonic acids.

7. The method of claim 1, in which the pigment is the coppered disazo pigment prepared from tetrazotized dianisidine and 2-naphthol 6-sulfonic acid.

8. The method of claim 1, in which the pigment is the coppered disazo pigment prepared from tetrazotized tolidine and 2-naphthol 6-sulfonic acid.

WILLIAM B. REYNOLDS.